July 16, 1968 W. H. MYERS 3,393,382

TRANSISTOR SWITCHING CIRCUIT

Filed Dec. 1, 1964

3,393,382
Patented July 16, 1968

3,393,382

TRANSISTOR SWITCHING CIRCUIT

William H. Myers, Grand Rapids, Mich., assignor to Lear Siegler, Inc.

Filed Dec. 1, 1964, Ser. No. 415,119
2 Claims. (Cl. 332—31)

ABSTRACT OF THE DISCLOSURE

A switching network including a pair of transistors (each having emitter, collector, and base electrodes) which are connected in a back-to-back parallel arrangement; i.e.; the emitter electrode of each of said transistors is connected to the collector electrode of the other of said pair of transistors. The respective emitter-collector junctions form input and output terminals for the switching network. In operation, the switch provides an output signal voltage modulated in synchronization with a reference voltage.

Figure 1:
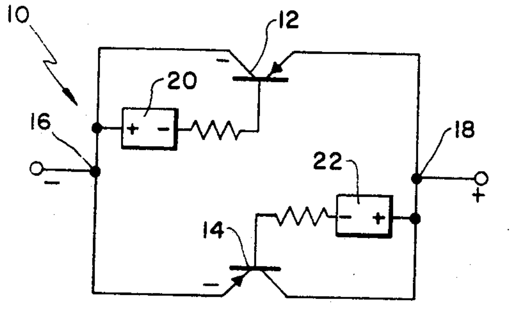

The switching network is not affected by transistor temperature variations, exhibits a relatively constant low conducting resistance and a constant low null voltage, and switching will always be accomplished with the transistor operating within its normal beta characteristic.

This invention relates to electronic switching devices, and to circuits in which such devices are utilized, and more particularly it relates to an electronic switching circuit having a unique network configuration which affords greatly improved switching operations.

Electronic switches in general are old in the art, and since the advent of semiconductors, many circuits have been developed to utilize the generally excellent switching characteristics of such devices. Previous circuits have all included certain limitations, however, which are the result of inherent semiconductor operation and stem from the fact that transistors and other semiconductors are not perfect switches. For example, semiconductor normal and inverse beta characteristics are not identical, and in fact may be significantly different. Also, beta characteristics are subject to change under operational conditions such as temperature increases. Previous switching circuits have failed to resolve these limitations, and have been subject to undesirable null shifts. Switching resistances in such circuits have been subject to change, and usually are not of a constant value throughout the desired range of operation. Furthermore, generally unsymmetrical operation of these circuits was very common.

The present invention has for its major objects the resolution of these undesirable limitations, by the provision of a switching network whose operation is not affected by the normal temperature variations of its transistors; whose "on" or conducting resistance is generally lower than that previously obtainable and is essentially constant under various conditions; which will operate at a very low and a very consistent null voltage value; in which at least some transistors are at any given time operating on their normal beta characteristics; and which effectively isolates its reference switching voltages and currents from the voltages and currents being transferred through the network.

These and other equally desirable objects and advantages will become increasingly apparent to those skilled in the art upon consideration of the following specification and its appended claims, taken in conjunction with the illustrative drawings setting forth a preferred embodiment of the network.

Figure 1A:
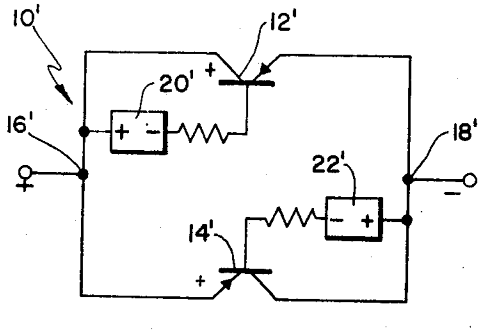
Figure 2:
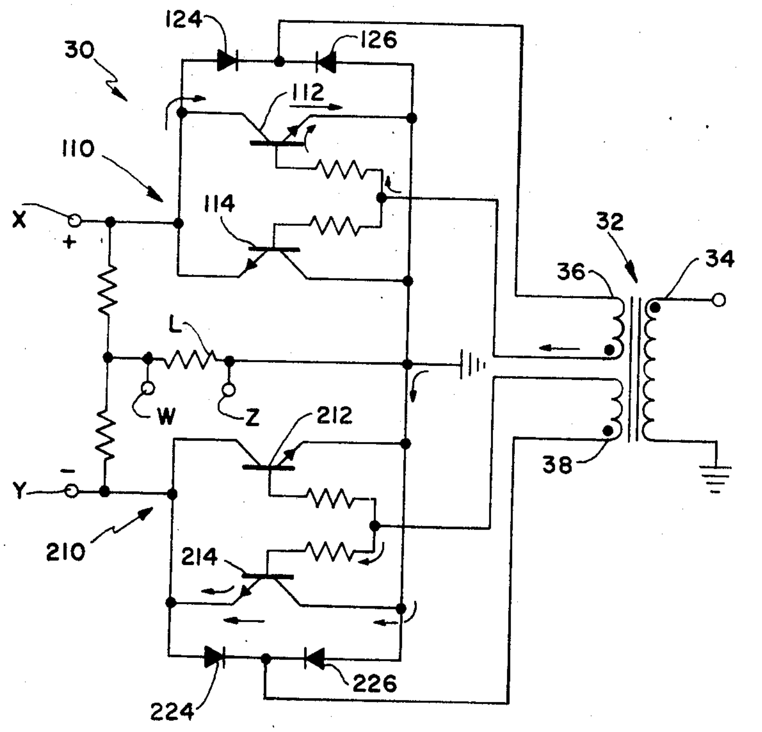

In the drawings:

FIG. 1 is a schematic representation of the novel switching network in a first operational mode;

FIG. 1*a* is a schematic representation of the switching network of FIG. 1 in a second operational mode; and FIG. 2 is a schematic representation of an illustrative circuit utilizing the switching network of FIG. 1.

Basically, the network of this invention involves a pair of switching transistors which are connected in a back-to-back parallel configuration; that is, the emitter electrode of each of the transistors is connected to the collector electrode of the other, and the two junctions resulting from this connection constitute the input and output of the switching circuit. A switching or reference voltage is connected to the base of each transistor, and serves to drive them both simultaneously into or out of conduction, thereby opening or closing the switch formed by the network. Thus, a direct or other signal voltage connected to the input of the switching network will be modulated in synchronization with whatever periodic variation may take place in the reference or switching voltage. Due to the back-to-back parallel arrangement, one or the other of the transistors will always operate on its normal beta characteristic, and this transistor will accomplish the switching of the input signal. Accordingly, the network will always operate symmetrically, and will be unaffected by changes in ambient temperature such as the normal heat rise that occurs during prolonged operation of electrical components. Furthermore, there will be no characteristic shift in the null of the network. Also, regardless of the particular mode of operation, the total circuit resistance across the switch during its "on" or conducting condition will be determined by the normal beta characteristic of one or the other of the transistors, and so it will be consistently lower than that previously attainable in other switching networks.

Referring now in detail to the drawings, the schematic of FIG. 1 shows the basic configuration of the switching network in its simplest form, without any external circuitry. The switching network 10 includes a pair of transistors 12 and 14, each having a collector electrode, an emitter electrode, and a base electrode. The two transistors 12 and 14 are connected in back-to-back parallel configuration, that is, the emitter of each transistor is connected to the collector of the other. Thus, the emitter of transistor 14 is connected at junction point 16 to the collector of transistor 12, and the emitter of the latter transistor is connected to the collector of the former at junction point 18. The junction points 16 and 18 then form the input and the output, respectively, of the switching network 10.

The transistors 12 and 14 of the switching network 10 are driven by a switching or reference current from the sources 20 and 22, respectively. The reference in practice may have almost any desired waveform, but for purposes of illustration it is assumed to be a periodically varying wave having the instantaneous polarities shown in the figure.

When a signal voltage of the instantaneous polarity shown in FIG. 1 is applied across the input and output terminals 16 and 18 of the network 10, and when the reference sources 20 and 22 have the polarities indicated, the switch 10 becomes, in effect, a closed circuit of relatively low resistance. That is, since a negative reference voltage is impressed upon the bases of the two PNP-type transistors of the illustration, they are in a conducting condition with the transistor 12 operating within its normal beta characteristic and the transistor 14 operating within its inverted beta characteristic. Moreover, since this voltage is applied between the base and collector of each transistor, they are in what is termed their "inverted drive" connection. Should the drive voltage be applied between the base and the emitter, then in this case the transistors would be in a "normal drive" connection.

With the negative signal voltage of this figure present at the collector of transistor 12 and at the emitter of transistor 14, transistor 12 operates on its normal beta characteristic. Conversely, transistor 14 operates on its inverse beta characteristic. For reasons given more fully hereinafter, the signal voltage at point 16 will for the greatest part be switched or connected to output terminal 18 through transistor 12, with a transfer characteristic that is essentially determined by the normal beta of this transistor.

Now, should the signal voltage be reversed in polarity, the switching network 10 of FIG. 1 would operate in the manner indicated by network 10' of FIG. 1*a*. That is, whereas transistor 12 in FIG. 1 was previously driven negatively from collector to emitter in a forward manner while connected in inverted base drive configuration, its counterpart, transistor 12' of FIG. 1*a* is seen to be driven in the opposite manner, with collector-to-emitter voltage being positive. Accordingly, the emitter and collector electrodes of transistor 12' have in effect changed roles from the corresponding electrodes of transistor 12. The collector of transistor 12' now functions as an emitter, and the emitter now functions as a collector. The transistor now operates as though it were in normal base drive configuration. Under these conditions, transistor 12' operates on its inverse beta characteristic.

In like manner, when the signal voltage changes its polarity, transistor 14 of FIG. 1 changes its apparent type of drive, and changes its operational characteristic. Whereas in FIG. 1 this transistor operated on its inverse beta (with its emitter acting as a collector and its collector acting as an emitter), when the signal voltage at terminal 16 changed its polarity, the collector and the emitter of counterpart transistor 14' (FIG. 1*a*) changed their operation, and the transistor began to operate on its forward beta characteristic. Thus, input signals having the polarity of FIG. 1*a* will be transferred across the switching network with a transfer characteristic that is essentially determined by transistor 14'.

As the above illustration shows, contrary to previous switches in which the conducting transistor has always operated alternatingly, first on its normal beta characteristic and then on its inverse beta, the present switching network is symmetrical, and at any given time has its active switching transistor operating on its normal beta characteristic, regardless of input signal polarity. Therefore, the transistors used in this circuit need not be selected with the great care previously required, since mismatches in beta characteristics and intrinsic conducting resistance do not present a problem. Moreover, the "on" resistance of the total network is of a constant value which is lower than that previously obtainable, since the effective circuit resistance will at any given time approximately equal the very low resistance of whichever forward-conducting transistor is then in operation, and not the higher conducting resistance of a transistor operating on its inverse beta, as has been true of previous circuits.

Even more importantly, however, the inherent limitation in previous transistor switching circuits of differences in offset voltage between the two operating modes of the switching transistors is minimized in a manner not previously accomplished. It is well known that offset voltage (i.e., the voltage which appears between the collector and the emitter solely as a result of the presence of the base drive voltage, when there is no voltage being applied to either collector or emitter and there is no current flow between them) is greater in normal base drive than it is in inverted base drive. Accordingly, switching circuits are normally designed to operate their transistors under inverted base drive conditions, since the lower offset voltage of this mode makes possible a much lower null. However, offset voltage is known to be a function of transistor beta, and since both normal and inverse transistor beta changes with temperature, so do offset voltages. Thus, shifts in null voltage increase and become more unpredictable at elevated operating temperatures.

Since the transistor which actively conducts input signals in the present switching circuit always operates on its normal beta, and since both of the transistors are connected in inverted base drive, considerations of offset voltage are minimized to a surprising degree. Also, since the back-to-back parallel arrangement is symmetrical in operation, the effects produced on transistor beta by temperature variations balance and cancel each other out. This results in the superior switching operation noted previously.

Since offset voltage always has a positive polarity from collector to emitter, these voltages tend to cancel each other in the present circuit, whereas previous circuits merely attempted to place them in series opposition, so that they would back each other and thereby tend to balance or be equalized. Such series opposition tracked poorly over a range of base current values, however, and at various points in this range the divergent values of offset voltage actually combine to produce a sharp spike voltage waveform instead of the idealized balanced condition hoped for. The present circuit exhibits no such undesirable result, since the parallel opposed voltages smoothly cancel each other over the entire range. Moreover, the circulating currents in the circuit tend to make it self-balancing with respect to its output terminals. Because of the above facts, together with the low offset null voltages obtainable with this network, changes in ambient temperatures as well as in base current differentials have very little or no effect on circuit operation. Nulls which may be obtained are extremely low (on the order of 1 millivolt or less) and are very steady and undeviating, regardless of the particular type of reference voltage drive utilized.

The basic switching network 10 can be utilized in a number of different circuit configurations, and no attempt will be made here to identify and demonstrate all such circuits. One of these arrangements having certain preferred and novel features in itself is shown in FIG. 2, however, as an illustration of the variety of uses which may be achieved by the use of the basic switching network.

In FIG. 2, a modulating circuit 30 is shown, which may be used to modulate direct current or other signal inputs into a current which varies periodically, in synchronization with a similarly varying reference current. The modulating circuit 30 includes two basic switching networks 110 and 210, which are essentially the same as the switching network 10 discussed previously, except that they utilize the NPN-type of transistor for purposes of illustration. The modulating circuit 30 includes input terminals X and Y, and output terminals W and Z, which receive the output voltage developed across output lead impedance L.

Each of the switching networks 110 and 210 of the modulator is shunted by a pair of diodes, 124 and 126, and 224 and 226, respectively. These diodes are connected back-to-back, that is, one of the electrodes of each diode in the pair is connected to the same electrode of the other diode. The two remaining electrodes are connected across the switching networks 110 and 210, thereby making an additional parallel branch of each of the sets of diodes.

The switching, or reference voltage for the modulating circuit 30 may be introduced by means of a transformer 32, having a primary 34 and as many secondary windings such as 36 and 38 as there are switching networks in the total circuit concerned. It should be noted that this represents a departure from what would normally be expected in circuits of the same general nature, since conventional circuits use either twice this number of windings, or else a more elaborate winding which includes at least one center tap, in order to accomplish a similar function. The reduction in the number of such windings is highly desirable, not only from the standpoint of cost, but also from that of operation, since every winding used in such a circuit introduces additional capacitive effects from the windings themselves. These effects broaden and obscure the null obtainable by the circuit, and introduce undesirable additional variables into the operation of the same.

The switching or reference voltage introduced to the moduating circuit 30 by its transformer 32 is usually a wave which varies periodically with time in some predetermined manner, whose periodical variations are desired to be reproduced at output terminals W and Z by modulating the voltage supplied to input terminals X and Y in synchronization with the switching voltage. Assuming that the input is direct or unidirectional current having the polarity indicated, and that the switching voltage across the primary 34 of the transformer 32 is initially positive, the modulating circuit 30 operates as follows.

Secondary winding 36 of transformer 32 is wound so that the switching voltage developed across it has a polarity opposite that received by primary 34. Accordingly, the bases of transistors 112 and 114 of switching network 110 are both supplied with instantaneously positive voltage. It will be noted that secondary winding 38 is wound in the opposite manner, so that the bases of transistors 212 and 214 of switching network 210 are both supplied with instantaneously negative voltage. Since NPN-type transistors are used in this illustration, network 210 is held at cut-off, whereas network 110, on the other hand, is in a conducting condition. What is more, the cathodes of diodes 124 and 126 are both supplied with instantaneously negative voltage from secondary winding 36, whereas the cathodes of diodes 224 and 226 are both supplied with instantaneously positive voltage. Accordingly, diodes 124 and 126 are in a conducting condition, while diodes 224 and 226 are at cutoff. Consequently, base current may flow through transistor 112 from the positive end of secondary winding 36 through the emitter of the transistor and through diode 126, and then back to the negative end of the secondary winding, as shown by the arrows. Transistor 114 is similarly forward biased and base current may flow through the transistor 114 from the positive end of the secondary winding 36 through the emitter of said transistor 114, through diode 124 and thence back to the negative end of the secondary winding. It will be noted that when network 110 is in a closed, or conducting state, the flow of direct or signal current is from input terminal X through transistor 112 from its collector to emitter, also shown by arrows in the figure. The transistor 114 will operate within its inverse beta characteristic due to the positive input signal at its emitter and will only conduct a small portion of the current. A change in input signal polarity at the terminal X will effect the flow of signal current through the transistor 114 rather than the transistor 112, i.e., the transistor 114 will now conduct within its normal beta characteristic while the transistor 112 will now operate within its inverse beta characteristic and pass little current. Thus, there will be no opposition between the signal current and the base current just noted, since they both flow in the same direction.

If it be assumed now that the reference voltage which is impressed upon primary winding 34 reverses its polarity, it will be observed that the bases of both transistors 112 and 114 are driven negative. Accordingly, they cease to conduct and switching network 110 enters an open or non-conducting state. Conversely, the bases of both transistors 212 and 214 are now driven positive, and these transistors begin to conduct. Thus, network 210 becomes closed and will conduct input signals. Since the polarity of the signal voltage supplied to input terminal Y is negative, however, current flow through network 210 will be in the direction shown by the arrows, i.e., in an opposite direction from the previous current flow in network 110, i.e., from the collector to the emitter of the transistor 214. A change in signal polarity at the terminal Y will result in a flow of signal current through the transistor 212 from collector to emitter similar to the current flow shown through said transistor 112 of the network 110. At the same time the transistor 214 will be non-conductive and will block the flow of current. Thus, the output of the entire modulating circuit 30 will be determined by the amount of current conducted through each of the operationally opposed switching networks 110 and 210. Since this in turn is determined by the wave shape of the reference current flowing in secondary windings 36 and 38, the shape of the output wave at terminals W and Z will be a synchronized reproduction of the periodic variations which take place in the reference voltage.

Having thoroughly disclosed the structure and the operation of my novel basic switching network, and of a preferred circuit utilizing this network which has its own novel aspects, it should be clear that the spirit of this invention and the concepts underlying it are susceptible to many variations in particularity and detail.

For instance, the transistors used throughout this description might be replaced by other suitable switching components, since the complete balancing characteristics of the back-to-back parallel circuit configuration are far more important than the mere fact that transistors are what are illustrated as being used in it. Thus, whatever component is chosen, so long as it has electrodes which correspond to those of the illustrative transistors herein, and so long as these are connected in the same manner, it is believed that the device partakes of the spirit of this invention. The same may also be said as regards the diodes used in the modulating circuit. That is, other rectifying or switching means might be used if connected back-to-back and with their electrodes bearing the same relationship to the other circuit components as has been shown herein.

Accordingly, I do not wish to be limited merely to the preferred embodiments shown herein, but only as is expressly set forth in the appended claims.

I claim:

1. In an electronic circuit for modulating direct current into current which varies periodically in synchronization with a varying reference current, of the type which includes an input for direct current, an output for modulated current, a source of reference voltage, and at least one switching network coupled into said circuit for switching the direct current in said synchronized manner, the improvement wherein:

at least one such switching network includes a pair of transistors, each having a base, connected in a back-to-back parallel arrangement and a pair of back-to-back rectifying means shunting said pair of transistors; and wherein said reference current is provided by a transformer having a primary and as many secondary windings as there are switching networks, with at least one of said secondary windings being connected at one of its ends to the base of one of said transistors and at its other end to the junction of said rectifying means.

2. An electronic circuit for modulating direct current into current which varies periodically in synchronization with a varying reference current, including:

a plurality of switching networks, each comprising a pair of transistors, each having a base, connected in a back-to-back parallel arrangement and a pair of back-to-back rectifying means shunting each such pair of transistors; and a transformer having a primary winding and as many secondary windings as there are switching networks, a distinct one of said secondary windings being connected across the bases of the pair of transistors and the junction of the pair of rectifying means within each switching network.

(References on following page)

References Cited

UNITED STATES PATENTS

| | | | |
|---|---|---|---|
| 2,836,734 | 5/1958 | Cichanowicz | 307—885 |
| 3,205,457 | 9/1965 | Bell. | |
| 3,213,348 | 10/1965 | Harper | 307—885 |
| 3,227,889 | 1/1966 | Paynter | 307—885 |
| 3,181,003 | 4/1965 | Sauber | 307—885 |
| 3,304,429 | 2/1967 | Bonin et al. | 307—885 |

FOREIGN PATENTS

| | | |
|---|---|---|
| 1,164,478 | 3/1964 | Germany. |

OTHER REFERENCES

Aoki et al.: "Bilateral Switching Using Nonsymmetric Elements," IRE Transactions on Electronic Computers, March 1961, pp. 42–50.

ALFRED L. BRODY, *Primary Examiner.*

ROY LAKE, *Examiner.*